United States Patent
James et al.

(10) Patent No.: US 12,457,512 B2
(45) Date of Patent: Oct. 28, 2025

(54) VALIDATION TESTS DURING OR AFTER CONSTRUCTION OF A CELL SITE

(71) Applicant: DISH Wireless L.L.C., Littleton, CO (US)

(72) Inventors: Paul James, Englewood, CO (US); Jeffrey Williamson, Fort Collins, CO (US); Arnold Agcaoili, Littleton, CO (US); Jeffrey McSchooler, Parker, CO (US); Satish Sharma, Englewood, CO (US); Suman Chandra Sharma, Henderson, NV (US)

(73) Assignee: DISH Wireless L.L.C., Littleton, CO (US)

( * ) Notice: Subject to any disclaimer, the term of this patent is extended or adjusted under 35 U.S.C. 154(b) by 566 days.

(21) Appl. No.: 17/929,685

(22) Filed: Sep. 3, 2022

(65) Prior Publication Data

US 2023/0085020 A1    Mar. 16, 2023

Related U.S. Application Data

(60) Provisional application No. 63/240,571, filed on Sep. 3, 2021.

(51) Int. Cl.
*H04W 24/08* (2009.01)

(52) U.S. Cl.
CPC .................................. *H04W 24/08* (2013.01)

(58) Field of Classification Search
CPC .... H04W 24/08; H04W 88/085; H04W 24/06
See application file for complete search history.

(56) References Cited

U.S. PATENT DOCUMENTS

| | | | |
|---|---|---|---|
| 10,694,399 B1* | 6/2020 | Tran | H01Q 3/01 |
| 2014/0160972 A1* | 6/2014 | Ketonen | H04W 24/06 370/252 |
| 2020/0187029 A1* | 6/2020 | Tagg | H04W 24/06 |
| 2020/0228210 A1* | 7/2020 | Lapierre | H04B 17/29 |
| 2021/0022085 A1* | 1/2021 | Abdelmonem | H04W 72/542 |
| 2022/0345915 A1* | 10/2022 | Mukherjee | H04L 45/50 |
| 2023/0046743 A1* | 2/2023 | Vaez-Ghaemi | H04B 10/25759 |
| 2024/0305533 A1* | 9/2024 | Bai | H04W 24/02 |

FOREIGN PATENT DOCUMENTS

WO    WO-2020067812 A1 *    4/2020    ......... H04L 41/0803

* cited by examiner

*Primary Examiner* — Nizar N Sivji
(74) *Attorney, Agent, or Firm* — Kilpatrick Townsend & Stockton LLP

(57) ABSTRACT

A method for testing a cell site during or after construction of the cell site is provided. In various embodiments, the method is implemented by a processor on a computing platform associated with a field technician. In those embodiments, the method includes pre-test configuration and connection, RU-testing, UE-testing, and post testing actions. In the pre-test configuration and connection, a connection is made with one or more cell site routers, and computing platform configures the cell site routers for the testing. In the RU-testing, one or more RUs are connected via the CSR, connections of the RU(s) and antennas connected to the RUs are tested. In the UE-testing, the field technician is instructed to perform various sector tests to test downlink connections between the UE and the RUs.

20 Claims, 11 Drawing Sheets

… (1)

VALIDATION TESTS DURING OR AFTER CONSTRUCTION OF A CELL SITE

CROSS REFERENCE TO RELATED APPLICATIONS

This application claims priority to U.S. Provisional Patent Appl. No. 63/240,571, filed on Sep. 3, 2021, the disclosure of which is incorporated by reference in its entirety for all purposes.

BACKGROUND

During or after construction of a cell site, a general contractor, or others including the field operator, installer, vendor, etc. is typically dispatched to test the newly constructed cell site installations in the field to ensure proper functionality of the cell site radio operations.

Prior to the actual commissioning of the cell site, a set of validation tests is typically used to validate transmits in the cell sector covered by the cell sites in advance of the actual commissioning of the cell site to forecast or to prevent any obstacles that may occur in advance of the actual commissioning of the cell site. This can give the general contractor added assurances about the expected reliability to put into operation a particular cell site.

It is desirable to provide a post-construction validation software tool operable at a cell site to perform a set of validations and tests of radio operations associated with a post constructed cell site at about the time of the post-construction for use by the general contractor and others to generate data and assess in advance the reliability of the constructed cell site and to ensure appropriate standards and operability are or will be met.

SUMMARY

A computing platform is configured to perform particular operations or actions by virtue of having software, firmware, hardware, or a combination of them installed on the system that in operation causes or cause the computing platform to perform the actions. One or more computer programs can be configured to perform particular operations or actions by virtue of including instructions that, when executed by data processing apparatus, cause the apparatus to perform the actions. One general aspect includes the computing platform configured to perform one or more tests during or after construction of a cell site. In some embodiments, the computing platform is configured to establish a connection with a cell site router (CSR) of the cell site. In those embodiments, the computing platform configures the CSR for the one or more tests. A connection with a Radio Unit (RU) through the CSR is then established by the computing platform. In those embodiments, the computing platform is configured to determine whether the RU has a predetermined version of RU software. In response to the determination that the RU has the predetermined version of the RU software, an RU test to determine if the RU has an alarm is performed. The computing platform is configured to perform establishing, through the RU, a connection with an antenna connected to the RU.

In those embodiments, the computing platform is configured to instruct the antenna to perform a mechanical test, and determine whether the antenna functions correctly based on a result of the mechanical test. In response to the determination that the antenna functions correctly, an instruction to a user to perform a sector test between user equipment and the RU is provided by the computing platform. The computing platform then receives, from the UE, a test result regarding the sector test. The computing platform is configured to generate a test report based on the test result.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Wireless mobile communication technology uses various standards and protocols to transmit data between a base transceiver station (BTS) and a wireless mobile device. The deployment of many small cells presents a need to validate radio operations at the post construction of the cell site to forecast obstacles and ensure reliability by the general contractor prior to commissioning the cell site.

In 3 GPP radio access networks (RANs) in LTE systems, the BTS can be a combination of evolved Node Bs (also commonly denoted as enhanced Node Bs, eNodeBs, or eNBs) and Radio Network Controllers (RNCs) in a Universal Terrestrial Radio Access Network (UTRAN), which communicates with the wireless mobile device, known as user equipment (UE). A downlink (DL) transmission can be a communication from the BTS (or eNodeB) to the wireless mobile device (or UE), and an uplink (UL) transmission can be a communication from the wireless mobile device to the BTS.

During and/or after installation of a cell site, various tests are typically performed to ensure physical components in the cell site are properly installed, and connectivity is provided by the cell site as intended. Installation of a cell site typically involves setting up new radios, antenna, connecting various types of cables, connecting power to the cell site, and/or any other events.

Challenges typically arise during cell site testing when the testing is not performed efficiently, or correct testing procedures are not followed. It thus is desired to have cell site testing procedure standardized via software tools such that a set of validation tests are performed in a preset sequence to ensure the cell site is properly tested.

Example System

Figure 1A:
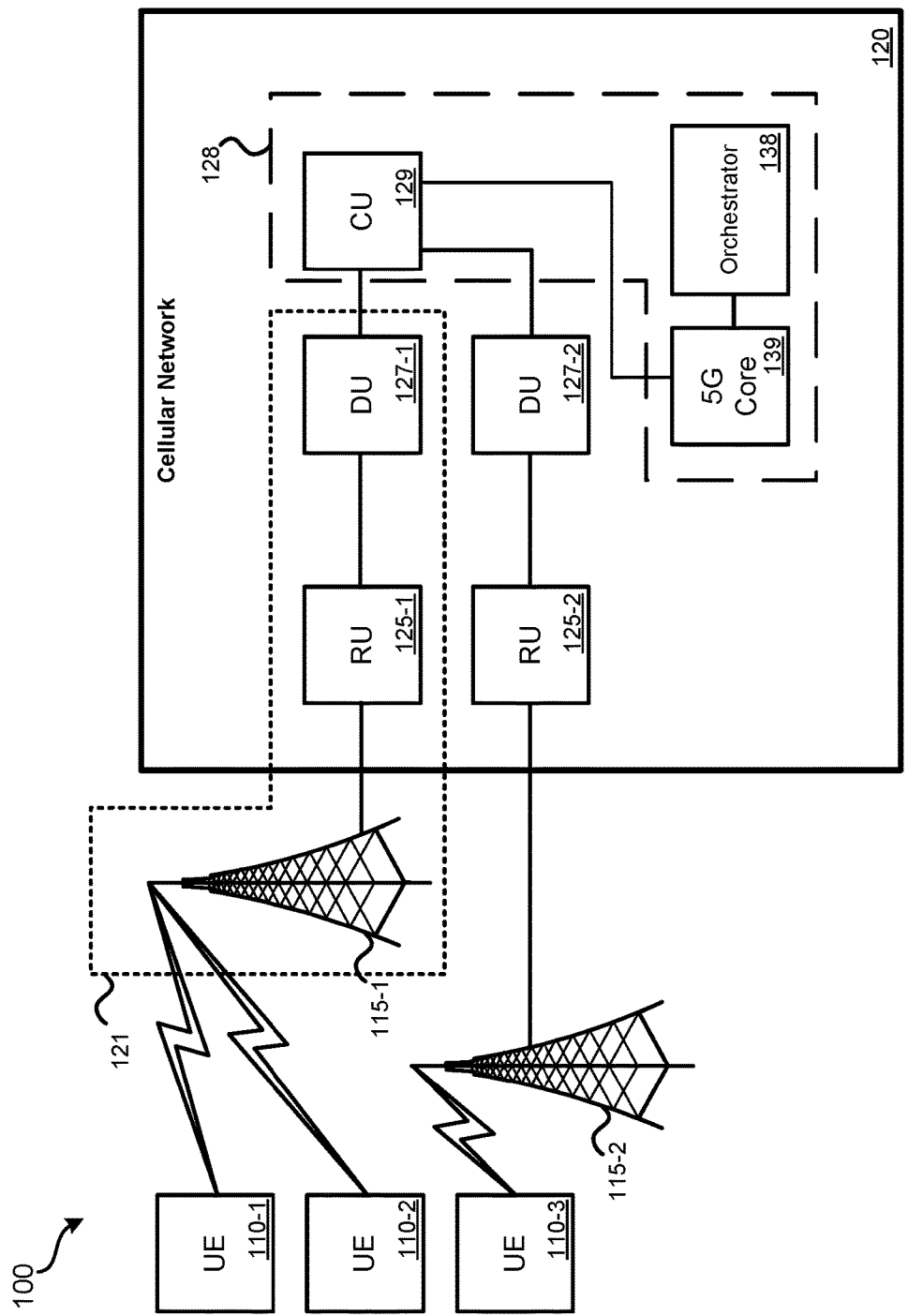
FIG. 1A illustrates an embodiment of a 5 G cellular network.

FIG. 1A illustrates an embodiment of a cellular network system 100 ("system 100") where various embodiments can be applied. It should be understood—although system 100 is described and illustrated in a context of 5 G, this is not intended to be limiting. It is understood embodiments provided herein can be applied to other types of cell sites when appropriate, such as LTE, 3 G, 6 G, WIFI or any other types of networks. In this example, system 100 can include a 5 G New Radio (NR) cellular network; other types of cellular networks are also possible. System 100 can include: UE 110 (UE 110-1, UE 110-2, UE 110-3); communication tower 115; cellular network 120; radio units 125 ("RUs 125"); distributed units 127 ("DUs 127"); centralized unit 129 ("CU 129"); 5 G core 139, and orchestrator 138. FIG. 1A represents a component level view. In an open radio access network (O-RAN), because components can be implemented as software in the cloud, except for components that need to receive and transmit RF, the functionality of the various components can be shifted among different servers to accommodate where the functionality of such components is needed.

UE 110 can represent various types of end-user devices, such as smartphones, cellular modems, cellular-enabled computerized devices, sensor devices, gaming devices, access points (APs), any computerized device capable of communicating via a cellular network, etc. Depending on the location of individual UEs, UE 110 may use RF to communicate with various base stations of cellular network 120. As illustrated, two base stations 115 (BS 115-1, 115-2) are illustrated. Real-world implementations of system 100 can include many (e.g., thousands) of base stations, RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5 G New Radio (NR), or some other RAT. The remainder of cellular network 120 may be based on an exclusive 5 G architecture, a hybrid 4 G/5 G architecture, a 4 G architecture, or some other cellular network architecture. Base station equipment 121, may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of spectrum, such as, for example, band 71. One or more DUs, such as DU 127-1, may communicate with CU 129. Collectively, RUs, DUs, and CUs create a gNodeB, which serves as the radio access network (RAN) of cellular network 120. CU 129 can communicate with 5 G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5 G core 139. Other DUs may or may not have this capability.

Figure 1B:
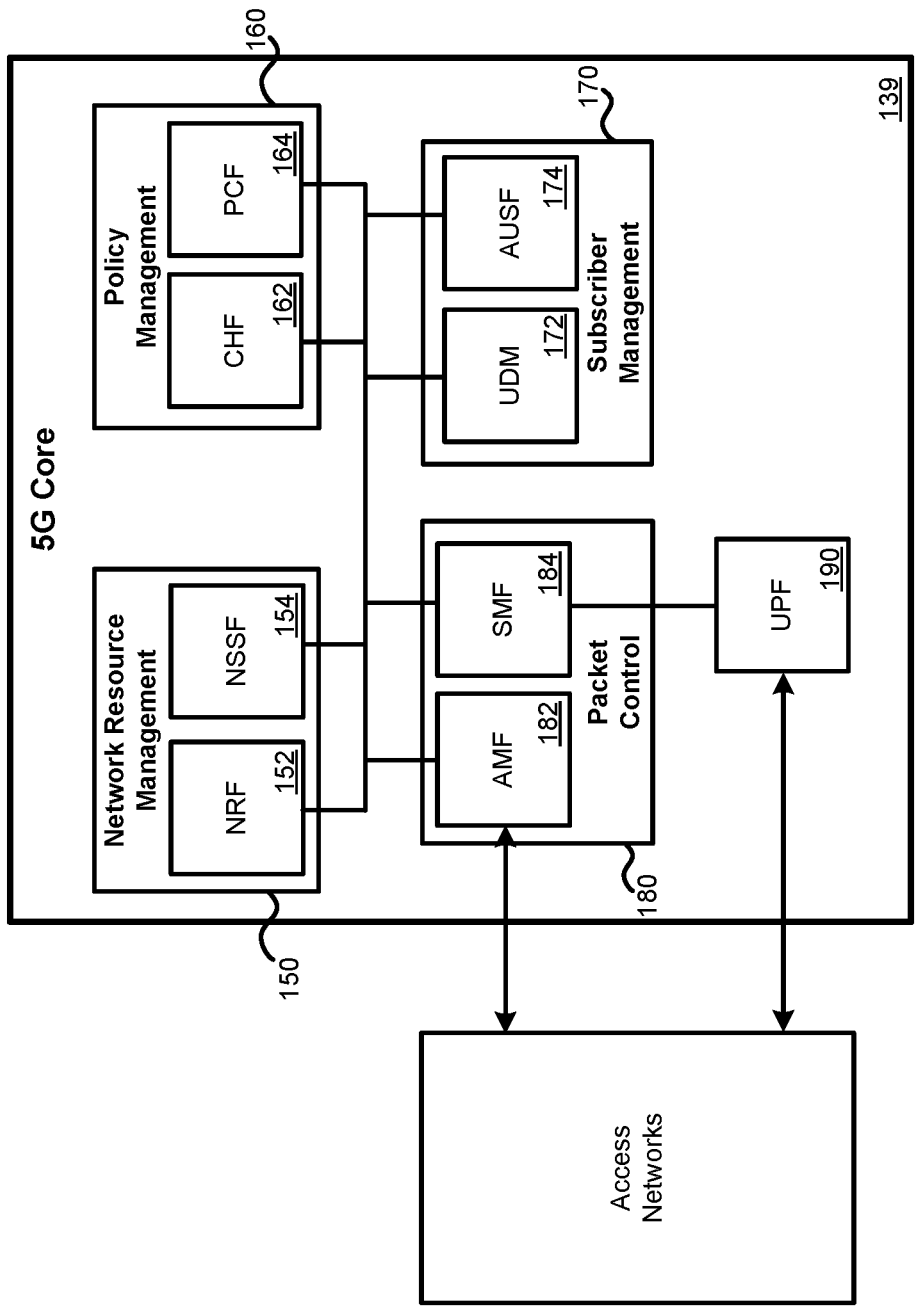
FIG. 1B illustrates an embodiment of a 5 G core of a 5 G cellular network.

Further detail regarding 5 G Core 139 is provided in relation to FIG. 1B. 5 G core 139, which can be physically distributed across data centers or located at a central national data center (NDC), can perform various core functions of the cellular network. 5 G core 139 can include: network resource management components 150; policy management components 160; subscriber management components 170; and packet control components 180. Individual components may communicate on a bus, thus allowing various components of 5 G core 139 to communicate with each other directly. 5 G core 139 is simplified to show some key components. Implementations can involve additional other components.

Network resource management components 150 can include: Network Repository Function (NRF) 152 and Network Slice Selection Function (NSSF) 154. NRF 152 can allow 5 G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. A converged online and offline charging can be supported. PCF 164 allows for policy control functions and the related 5 G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection and session related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

While FIGS. 1A and 1B illustrate various components of cellular network 120, it should be understood that other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5 G core 139. Functionality of such components can be co-located or located at disparate physical server systems. For example, certain components of 5 G core 139 may be co-located with components of CU 129.

In a possible O-RAN implementation, DUs 127, CU 129, 5 G core 139, orchestrator 138, can be implemented virtually as software being executed by general-purpose computing equipment, such as in a data center. Therefore, depending on needs, the functionality of a DU, CU, and/or 5 G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, 5 G core 139, and orchestrator 138. In some embodiments, DUs 127 may be partially or fully added to cloud-based cellular network components 128. Such cloud-based cellular network components 128 may be executed as specialized software executed by underlying general-purpose computer servers. Cloud-based cellular network components 128 may be executed on a third-party cloud-based computing platform. For instance, a separate entity that provides a cloud-based computing platform may have the ability to devote additional hardware resources to cloud-based cellular network components 128 or implement additional instances of such components when requested.

Kubernetes, or some other container orchestration platform, can be used to create and destroy the logical DU, CU, 5 G core units and subunits as needed for the cellular network 120 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU is no longer needed, Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Figure 2:
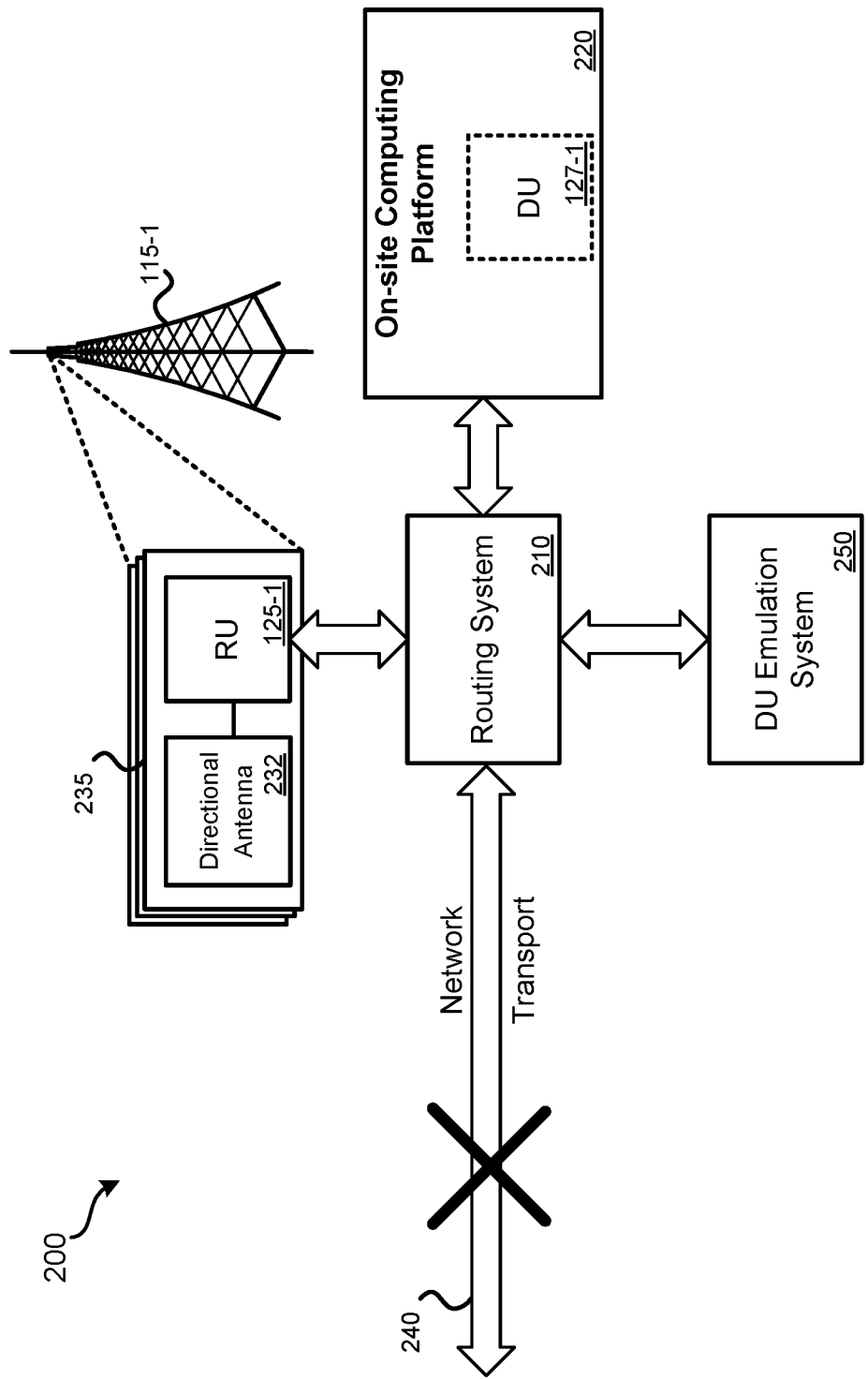
FIG. 2 illustrates an embodiment of a distributed unit emulation system.

Orchestrator 138 can allow for the instantiation of new cloud-based components of cellular network 120, including components of terminating service provider system 230 detailed in relation to FIG. 2. As an example, to instantiate a new DU, orchestrator 138 can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1, a second set of network slices, which may only partially overlap or may be wholly different than the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5 G core 139 may include various software components that are required to communicate with each other, handle large volumes of data traffic, and be able to properly respond to changes in the network. In order to ensure not only the functionality and interoperability of such components, but also the ability to respond to changing network conditions and the ability to meet or perform above vendor specifications, significant testing must be performed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Distributed Unit (DU) Emulation For Cellular Network Site Testing

When base stations are being added to a cellular network, a significant amount of installation work needs to be performed on-site. A structure may need to be erected, possibly upon a cement pad poured to support the structure. One or more directional antennas may need to be installed upon the structure. The directional antennas may then need to be connected to corresponding RUs. These RUs may need to be powered and connected to a routing system. The routing system may need to be properly connected with a computing system housed at the base station. Further, the routing system may need to be connected with a network transport connection, which allows other components of the cellular network (e.g., the core, a CU) to communicate with the routing system and connected components.

During installation, the network transport connection may be oftentimes made last. In some situations, days, weeks, or even months may pass between when the other components of the base station are installed and when the network transport connection is activated. Common problems at new cellular installations include connections between RUs and a routing system or connections between antennas and an RU are made incorrectly or are reversed. Such testing as detailed herein can allow for such misconnections to be quickly identified. Therefore, if testing of the base station is to be performed via the network transport connection, such testing may be significantly delayed. This delay may cause substantial problems if changes are needed to correct problems at the cell site. For instance, the installation crew may no longer be nearby to implement such changes. Requiring the installation crew to return to the cell site may need to be scheduled many days or weeks later, further delaying activation of the base station.

In order to enable testing prior to the network transport connection being activated, a DU emulator may be used. FIG. 2 illustrates an example of a cell site under construction. In this example, the cell site 200 includes: routing system 210; RU 125-1; directional antenna 232; cabinet structure 235; on-site computing platform 220; inactive network transport 240; and DU emulation system 250. In the illustrated embodiment of system 200, the cellular network is a 5 G New Radio (NR) cellular network; however, in other embodiments, the cellular network may be some other generation or type of cellular network (e.g., 4 G Long Term Evolution (LTE), 6 G, etc.). As shown in this example, there can be multiple cabinet structures 235 in the cell site 200.

In some embodiments, a given cabinet structure 235 is built to elevate one or more antennas, such as directional antenna 232. In other embodiments, an existing structure may be used, such as a building, radio tower, bridge, etc. Whether purpose-built or existing, multiple pairs of RUs and directional antennas may be attached with the given cabinet structure 235. Each directional antenna may need to be aimed and connected with a corresponding RU.

The RUs may be connected with routing system 210. Routing system 210 can serve to route data between network transport 240, on-site computing platform 220; and the installed RUs, such as RU 125-1. Network transport 240 is not yet activated and, therefore, communication between the cellular network and routing system 210 is not yet possible. At some point in the future, network transport 240 is activated, thus connecting routing system 210 with the cellular network.

On-site computing platform 220 can represent general-purpose computing hardware. At some point in the future, such as following network transport 240 being activated, specialized software that is executed by on-site computing platform 220 and functions as DU 222 may be loaded and executed. However, at the time of testing, such specialized software may not be available, such as because network transport 240 is not yet available.

Therefore, at a time of testing, cabinet structure 235 may be built, RUs may be installed and connected with directional antennas and routing system 210, and routing system 210 may be connected with on-site computing platform 220, but DU software is not yet installed.

DU emulation system 250 can represent specialized software installed on general purpose hardware that can be temporarily physically connected directly with routing system 210. For example, DU emulation system 250 may be plugged via cable into routing system 210. In other embodiments, a direct wireless communication connection can be established between DU emulation system 250 and routing system 210.

DU emulation system 250 can emulate functions of DU 222 to allow for the directional antennas, RUs, routing system 210, and aspects of on-site computing platform 220 to be tested. DU emulation system 250 can test communication via each directional antenna with a UE. Since each RU transmits a different physical cell identifier (PCI), communication between a UE and DU emulation system 250 via routing system 210, an RU, and a directional antenna can be used to test parameters such as: voltage standing wave ratio (VSWR); passive intermodulation (PIM); receiver sensitivity; antenna down tilt; and fiber signal strength with each RU.

While the software for DU 222 may not yet be installed, DU emulation system 250 can ensure that communication with on-site computing platform 220 is available and can occur at an acceptable speed with less than a maximum amount of error. Such testing can at least ensure that on-site computing platform 220 is physically connected properly with routing system 210 and is powered.

DU emulation system 250 may generate a report or certificate that indicates test results and/or whether all tests have been passed. If a failure is present, DU emulation system 250 outputs an indication of the failed test and the components involved in the failed test, thus allowing the failure to be diagnosed. Once testing is complete, DU emulation system 250 may be disconnected and used to test other base station installations that have yet to be connected with network transport 240. When testing is complete, the network transport can be expected to still not have been activated yet.

Cellular Network Core Validation Platform

Figure 3:
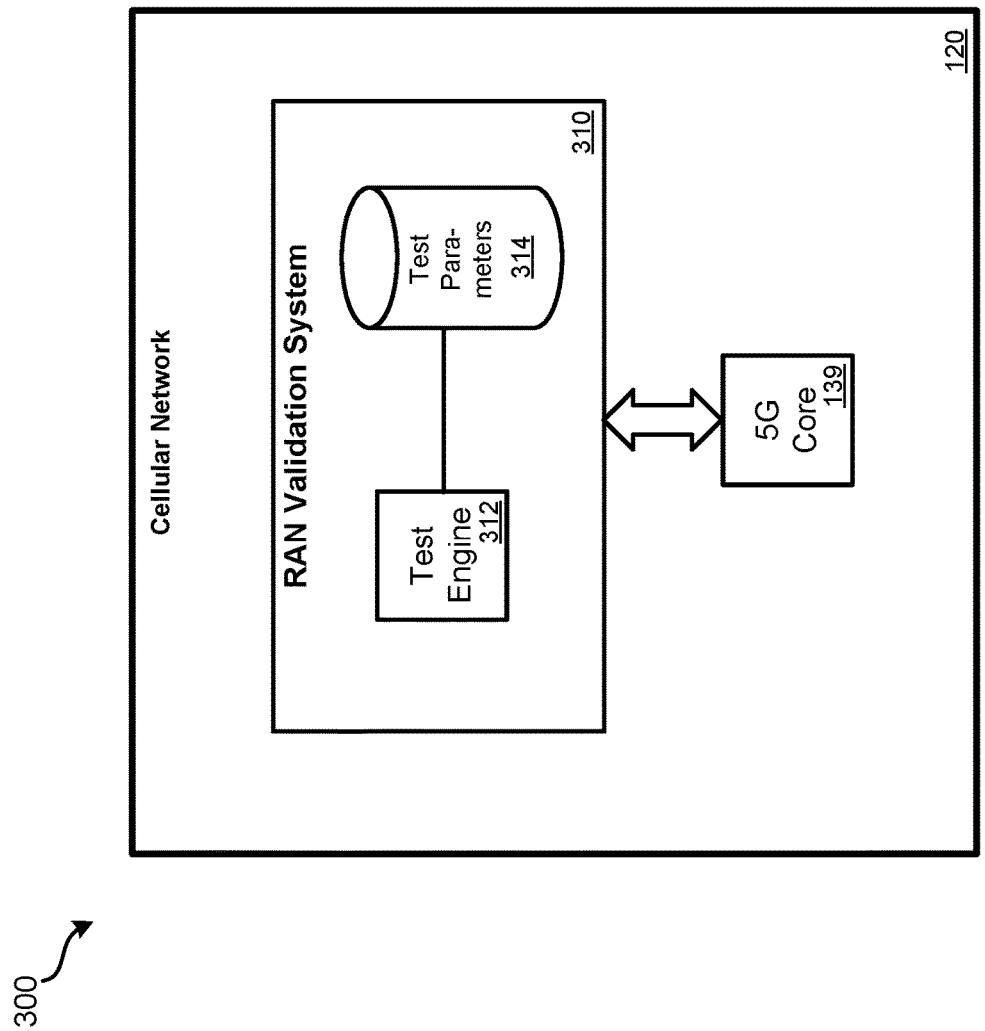
FIG. 3 illustrates an embodiment of a cloud-based cellular network heartbeat monitoring platform.

Building a next-generation cellular network generally requires multiple aspects of the cellular network to be developed simultaneously. For a 5 G cellular network, the RAN may be built out at the same time the 5 G core is being built. Significant testing of the 5 G core may need to be performed to ensure when the cellular network is activated for customers, and calls and messages can be routed correctly. Therefore, a RAN may need to be simulated in order to test functionality of the 5 G core. FIG. 3 illustrates an embodiment of a radio access network (RAN) validation platform system 300 ("system 300") for testing of a 5 G network core.

System 300 can include a RAN validation system 310 being implemented using one or more server systems, or as a cloud-based process, that is in communication with the cellular network core, such as 5 G core 139. RAN validation system 310 may include at least: test engine 312 and test parameters 514. RAN validation system 310 may emulate one or more CUs. From the perspective of 5 G core 139, RAN validation system 310 may appear functionally identical to a CU of a physical RAN.

A primary test performed by RAN validation system 310 may be to attempt to complete local phone calls and send local text messages. By emulating a portion of the RAN (e.g., a CU), RAN validation system 310 may attempt to complete a local phone call through 5 G core 139. The local phone call can be expected to be routed back to the same CU. Therefore, if 5 G core 139 is functioning properly, 5 G core 139 will send data to RAN validation system 510 that attempts to connect the call with UE that communicates via the same CU. Similarly, RAN validation system 310 may send SMS or MMS text messages to another local (emulated) UE. If 5 G core 139 is functioning properly, the message should be routed back to RAN validation system 310 for delivery (assuming the message is eligible for delivery, such as the account of the transmitting emulated UE being permitted to send MMS and/or SMS messages).

Various test parameters 314 may be stored and accessed by test engine 512. For instance, texts and calls from eligible and ineligible emulated UE may be sent to 5 G core 139 to test whether 5 G core 139 either correctly completes or blocks the calls and texts from being completed. RAN validation system 310 may create a log of passed and failed tests for review by developers.

Cell Site Connectivity Validation

Example cell site validation tests for validating connectivity in a cell site during or after installation of the cell site are provided. In various embodiments, the example validation tests are implemented by the DU 127-1 in the on-site computing platform 220 shown in FIG. 2. For instance, the on-site computing platform is a laptop computer of a technician dispatched to the cell site to perform one or more validation tests to ensure plumbing of the cell site is properly installed. For example, there could be one or more construction issues that could delay the commencement of the cell site. For instance, validation tests can be performed to ensure various cables such as fiber are installed properly to connecting various parts of the cell site as illustrated and described herein, after the cables are laid in the cell site. The validation tests can help determine if the cables are properly laid in the cell site and/or at which points in the cables there are connection issues.

Figure 4:
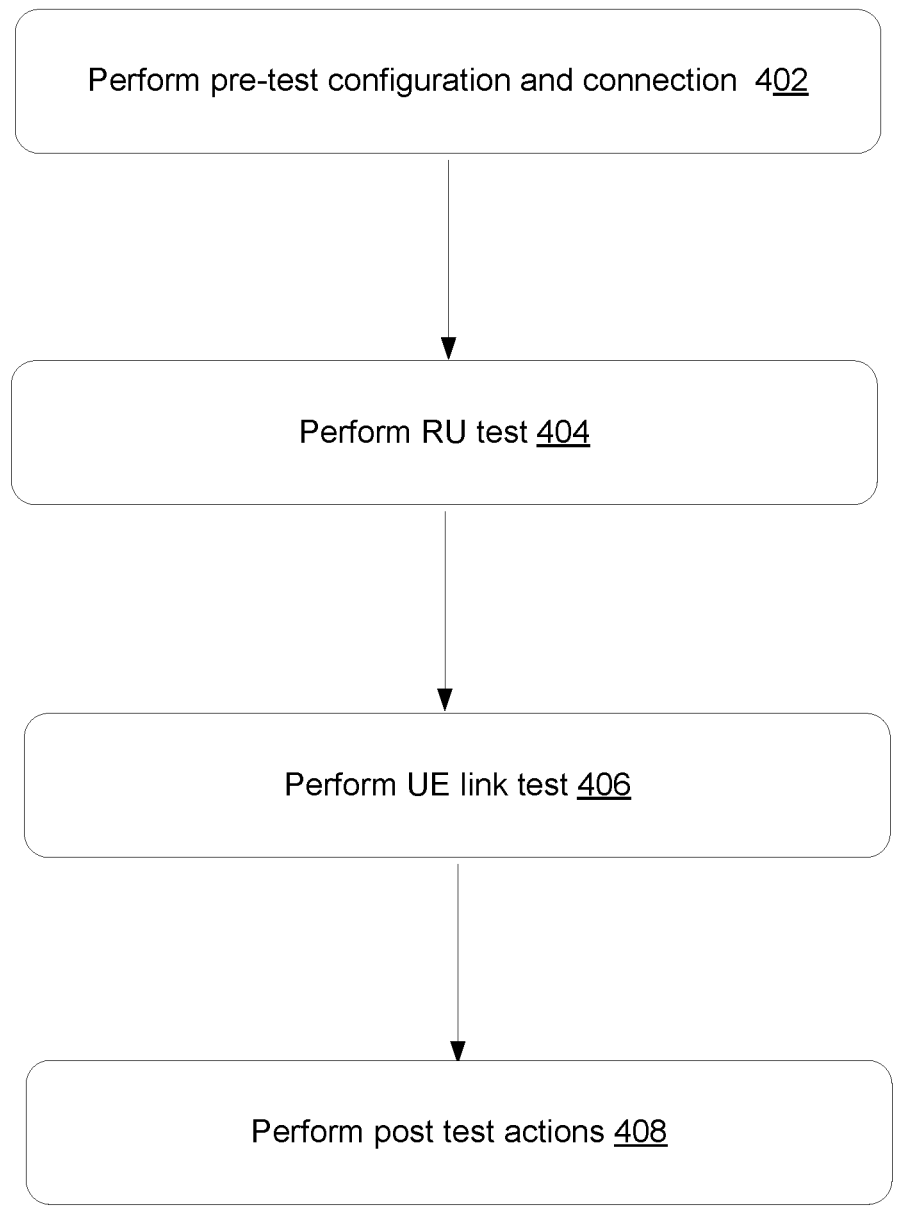
FIG. 4 illustrates an example of a method for validating connectivity of a cell site during or after installation of the cell site in accordance one embodiment.

FIG. 4 illustrates an example of a method for validating connectivity of a cell site during or after installation of the cell site in accordance one embodiment. The operations of method 400 presented below are intended to be illustrative. In some embodiments, method 400 may be accomplished with one or more additional operations not described and/or without one or more of the operations discussed. Additionally, the order in which the operations of method 400 are illustrated in FIG. 4 and described below is not intended to be limiting.

In some embodiments, method 400 may be implemented by a device including one or more of the processor, such as the on-site computing platform 220 shown in FIG. 2. The device may include a digital processor, an analog processor, a digital circuit designed to process information, an analog circuit designed to process information, a state machine, and/or other mechanisms for electronically processing information. The device may execute some or all of the operations of method 400 in response to instructions stored electronically on an electronic storage medium. The device may include one or more components configured through hardware, firmware, and/or software to be designed for execution of one or more of the operations of method 400.

Figure 5:
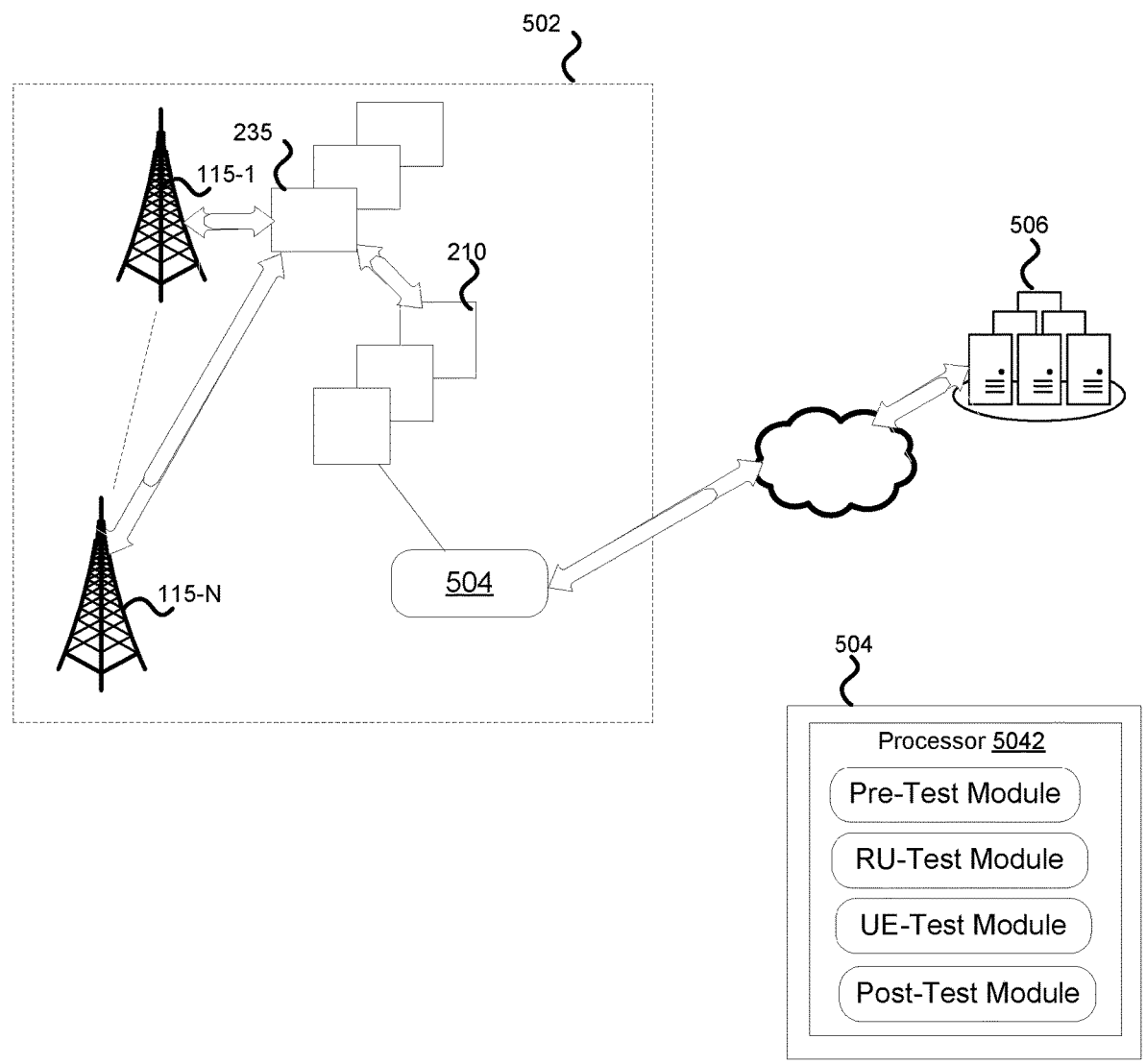
FIG. 5 conceptually illustrates one example of performing the method shown in FIG. 4 *in* accordance one embodiment.

In some embodiments, method 400 is implemented by an on-site computing platform such as 220 shown in FIG. 2. In one embodiment, the on-site computing platform implementing method 400 is a laptop of a field technician, and method 400 is implemented by the laptop as testing software that can be run by the field technician. FIG. 5 conceptually illustrates one example of performing method 400 in accordance one embodiment. As shown in FIG. 5, a given cell site 502 can comprise one or more routing systems 210 (e.g., cell site routers), one or more cabinet structures 235 housing RUs and antennas, one or more communication towers such as 115-1 to 115-n shown in this example. As also shown, the routing systems 210, the RUs and antennas, and the communication towers are interconnected through one or more types of cables such as fiber, coaxial or any other types of cables. During construction of the cell site 502, it may be desired to run method 400 at certain stage or stages, for example after some or all of the cabinet structures 235 are set up. This can help detect if there are certain issues, such as faulty wiring, component(s), and/or installation are introduced during the construction of the cell site 502.

As shown in FIG. 5, the method 400 is implemented, in this example, in a laptop 504 of a field technician. The laptop 504 can be configured to run pre-test configuration, for example connecting to the routing system 210, to instigate various tests to test the RUs and antennas. The laptop 504 can be configured to instruct the field technician to run one or more UE link test to test RU's connection with the UE. The laptop 504 can be configured to perform post test actions, for example uploading test results to a server 506. The server 506 may be operated by a provider of the cell site 502. The server 506 can be configured to store the test results provided by the laptop 504 for access to address one or more issues of the construction of the cell site 502. The laptop 504 comprises one or more processors configured to execute computer modules, which as shown, comprise a pre-test module, RU-test module, a UE-test module, a post-test module, and/or any other modules. These modules may be referred to as testing software on the field technician's laptop 504, collectively.

At 402, pre-test configuration and connection are performed. In some embodiments, this may involve connecting the laptop 504 to one or more routing systems 210, detecting a version of the routing systems 210, configuring the routing systems with one or more configuration for running the test(s), and/or any other steps. One example of 402 is described and illustrated in FIG. 6 and method 600. In some embodiments, operations in 402 are implemented by the pre-test module on the laptop 504.

Figure 7:
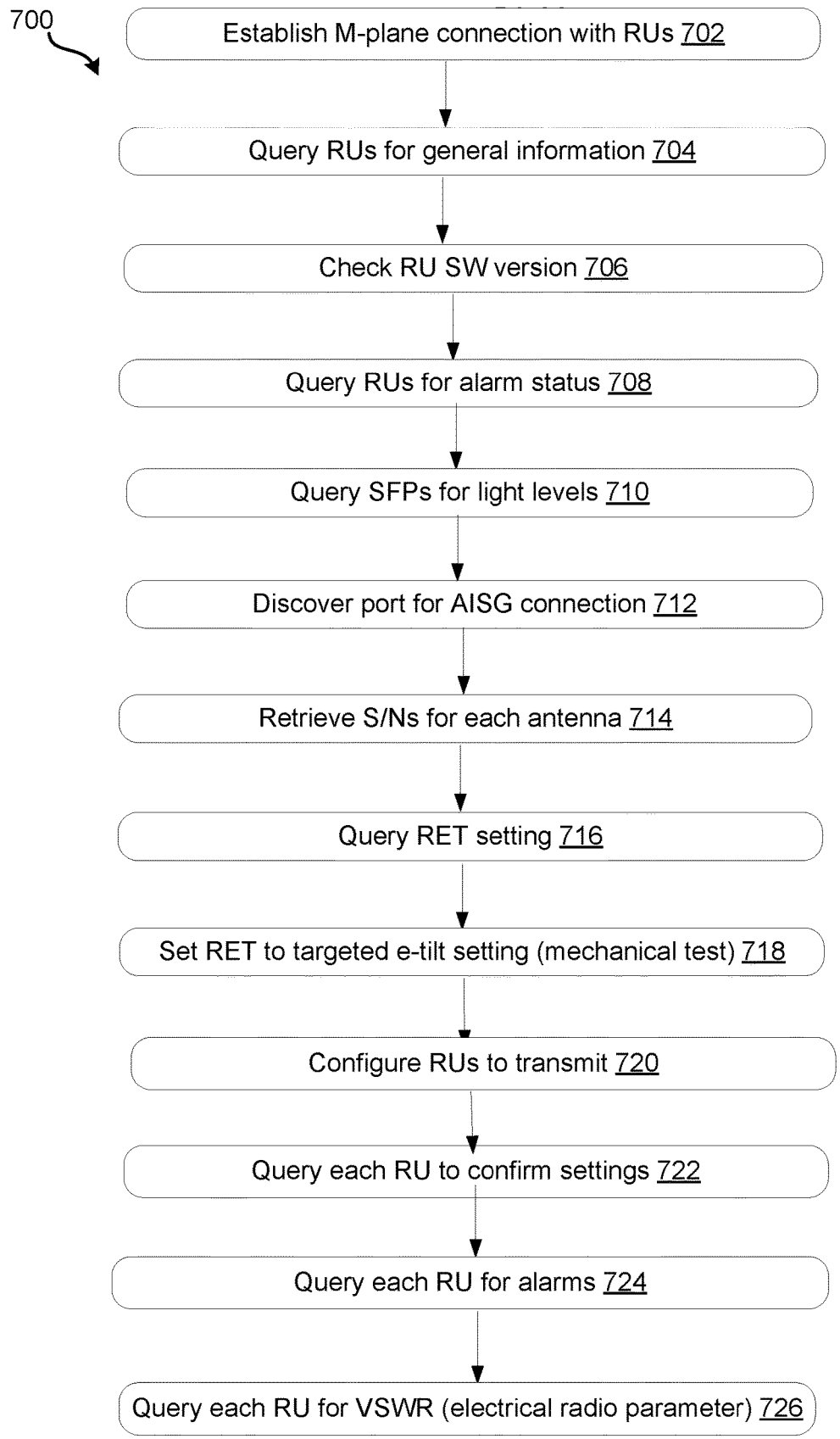
FIG. 7 illustrates another example of a method for validating connectivity of a cell site during or after installation of the cell site in accordance with one embodiment.

At 404, one or more RU tests are performed. In some embodiments, this may involve instructing, from the laptop 504, the RU(s) to run various functionality tests to test connections with the antenna and/or the communication tower. In some embodiments, this may involve mechanically testing one or more antennas connected to a particular RU. In some embodiments, 404 is performed only after 402 has a pass result. FIG. 7 illustrates a method 700 that is one example of 404. In some embodiments, operations in 404 are implemented by the RU-test module on the laptop 504.

Figure 8:
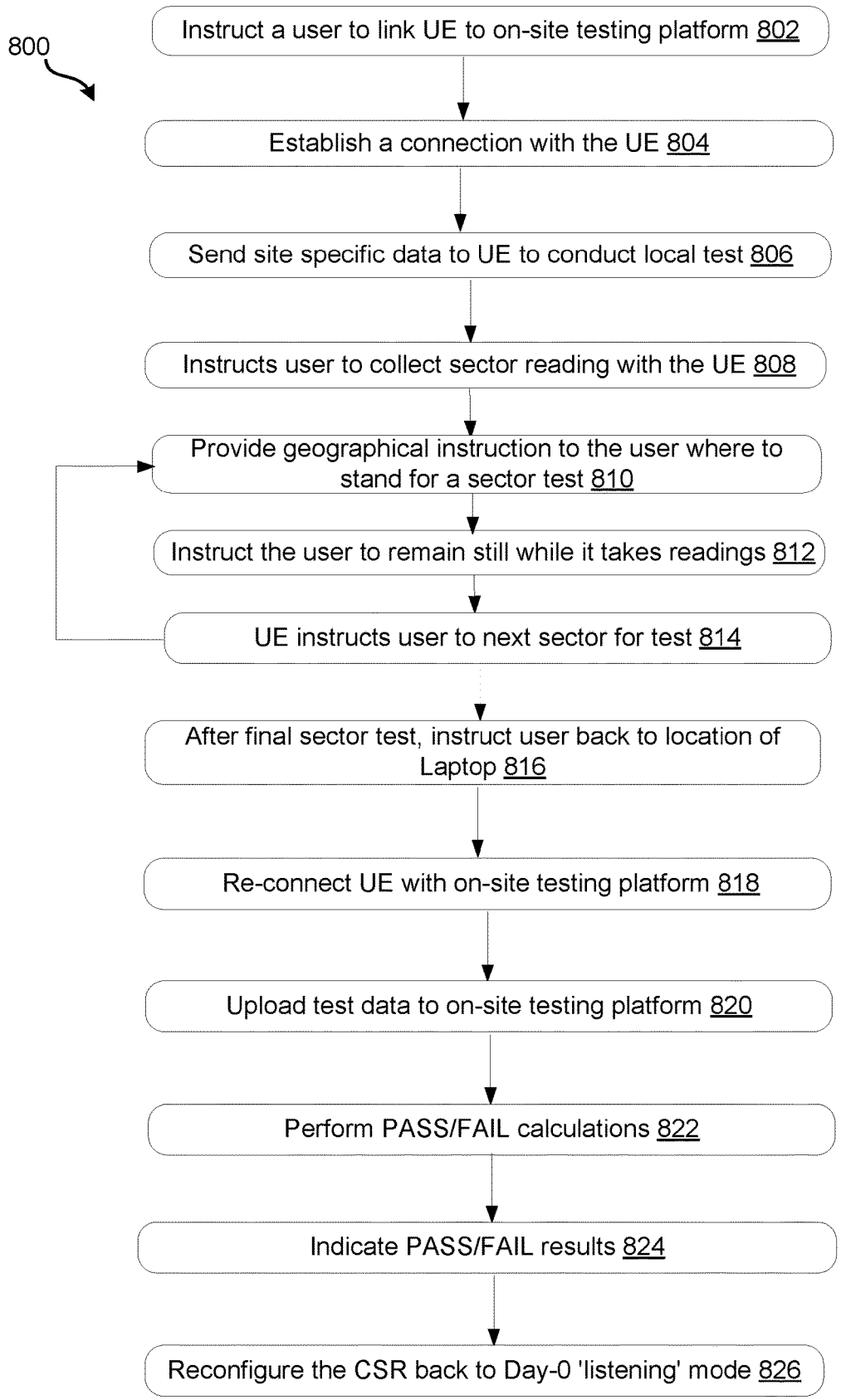
FIG. 8 illustrates still another example of a method for validating connectivity of a cell site during or after installation of the cell site in accordance with one embodiment.

At 406, a user (e.g., the field technician) is instructed to perform various tests to test downlink connections between UE and one or more RUs. This may involve instructing the user to go to various sectors in the cell site 502 to run downlink tests and take readings from the downlink tests. This may involve determining whether the readings indicate pass or fail, and generating test reports accordingly. FIG. 8 illustrates a method 800 that is one example of 406. In some embodiments, 406 is performed only after 404 has a pass result. In some embodiments, operations in 406 are implemented by the UE-test module on the laptop 504.

Figure 9:
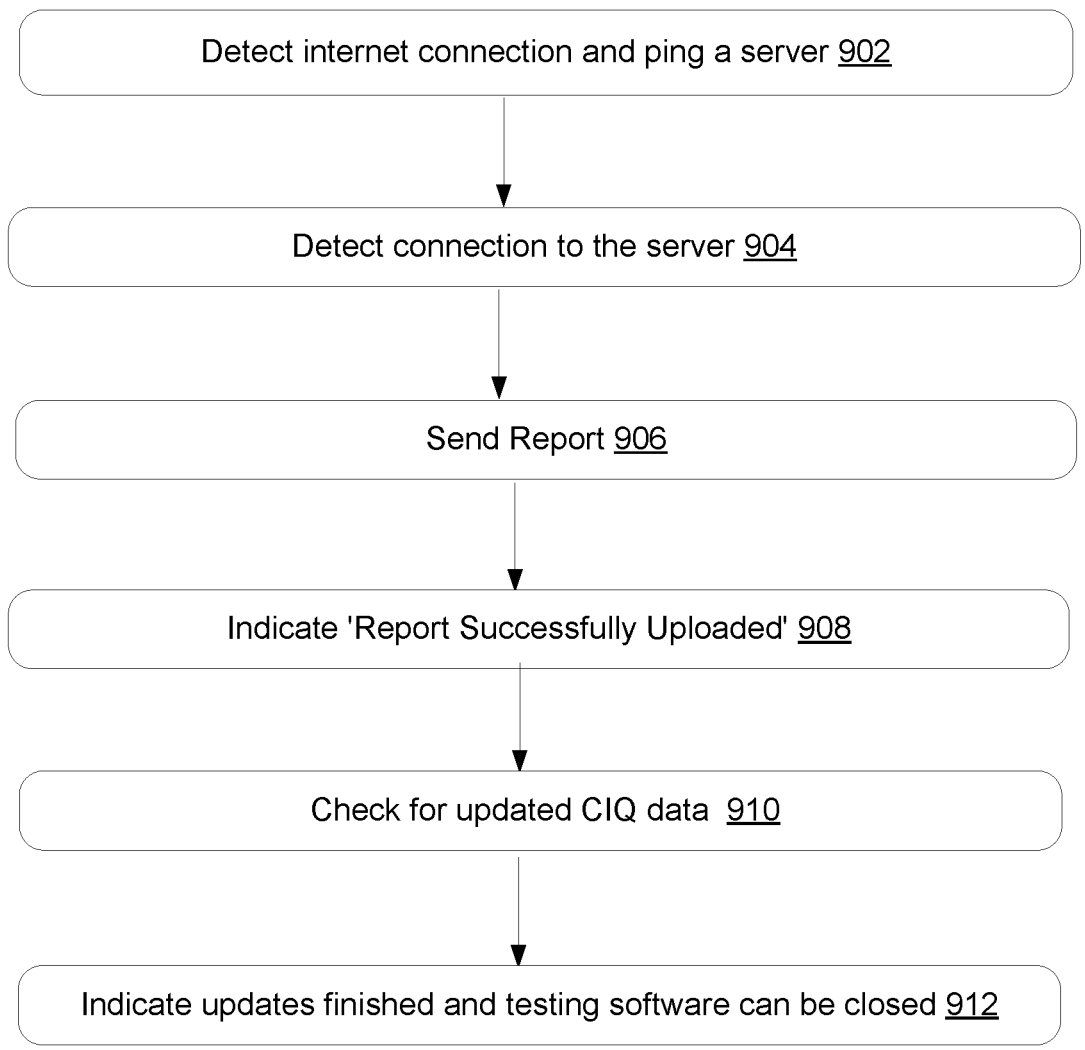
FIG. 9 illustrates yet another example of a method for validating connectivity of a cell site during or after installation of the cell site in accordance with one embodiment.

At 408, post test actions are performed. This may involve sending test data and/or results to the server 506. FIG. 9 illustrate a method 900 that is one example of 406. In some embodiments, 408 is performed only after 406 has a pass result. In some embodiments, operations in 408 are implemented by the Post-test module on the laptop 504.

Figure 6:
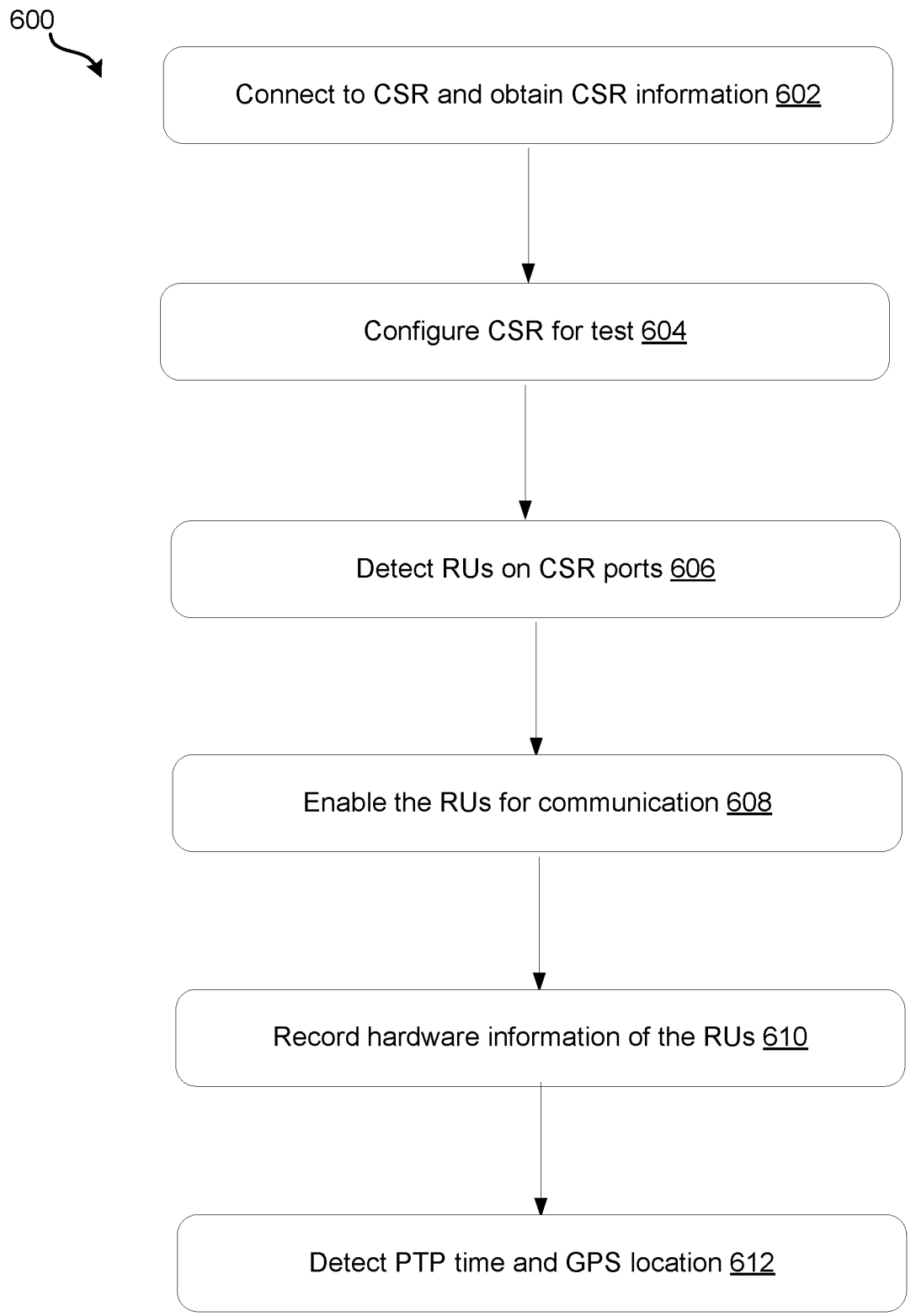
FIG. 6 illustrates an example of a method for validating connectivity of a cell site during or after installation of the cell site in accordance with one embodiment.

FIG. 6 illustrates an example of a method for validating connectivity of a cell site during or after installation of the cell site in accordance with one embodiment. It will be described with reference to FIG. 2. The operations of method 600 presented below are intended to be illustrative. In some embodiments, method 600 may be accomplished with one or more additional operations not described and/or without one or more of the operations discussed. Additionally, the order in which the operations of method 600 are illustrated in FIG. 6 and described below is not intended to be limiting.

In some embodiments, method 600 may be implemented by a device including one or more of the processor, such as the on-site computing platform 220 shown in FIG. 2. The device may include a digital processor, an analog processor, a digital circuit designed to process information, an analog circuit designed to process information, a state machine, and/or other mechanisms for electronically processing information. The device may execute some or all of the operations of method 600 in response to instructions stored electronically on an electronic storage medium. The device may include one or more components configured through hardware, firmware, and/or software to be designed for execution of one or more of the operations of method 600.

At 602, a cell site router system (CSR) is connected to the device, such as the on-site computing platform 220 shown in FIG. 2. One example of the CSR is the routing system 210 shown in FIG. 2. During construction a cell site, such as the cell site 502 shown in FIG. 5, at certain phase, one or more of the cabinet structure 235 have been set up—individual RUs 125-1 have been connected with corresponding directional antennas 232 in a given cabinet structure 235, and cables have been laid from the given cabinet structure 235 to the CSR, the communication tower and/or any other components in the cell stie. In one example, the cables are of hybrid types including fiber, coaxial, or any other types of cables. Typically, one or more RUs in the given cabinet structure 235 is connected with the CSR using one or more fiber cables. In one embodiment, 602 is performed after midhual fiber has been laid in the cell site.

Typically, a given RU, such as the RU 125-1 in cabinet structure 235 is connected to one or more antennas of different configurations. The different configurations of the antenna connections to the given RU can facilitate different communication coverage (for example, in terms of distance and/or frequency) enabled by the given RU. One or more of such antenna connections to the given RU is to be tested/validated as will be described below. For instance, a given antenna may be configured to tilt at certain degree so not to interfere with another antenna's communication path. The configurations of these antennas should be tested to ensure their communication paths indeed do not interfere with each other.

In some embodiments, 602 is performed by a field technician dispatched to the cell site. For instance, in one embodiment, the field technician has the knowledge of which port on the CSR his/her laptop having the testing software should be plugged into. However, this is not intended to be limiting. It is contemplated that the connection to the CSR at 602 can be performed automatically and remotely without a technician's intervention in the field site. In that embodiment, after the CSR is connected to the laptop, the testing software on the field technician's laptop obtains CSR information regarding various parameters of the CSR—for example, on which ports of the CSR, particular RUs are connected, one or more IP addresses used by the CSR, an identification of the CSR indicating a type of the CSR, and/or any other parameters.

At 604, one or more testing configurations for the CSR are pushed to the CSR based on the information obtained at 602. For example, a database may be implemented on the laptop of the field technician, storing various configurations for different CSRs across multiple cell sites. Based on the particular CSR information obtained at 602, the testing software on the field technician's software can push a matching configuration to the CSR connected at 602. In one embodiment, the matching configuration pushed to the CSR at 602 provides reachability to RUs connected the CSR and to one or more m/c-plane ports.

At 606, one or more RUs connected to the CSR are detected. For instance, after the configuration pushed at 604 to the CSR, the CSR provides a list of RUs connected to the CSR and their corresponding ports on the CSR. Based on this list, in that instance, the testing software on the technician's laptop can obtain RU information regarding the RUs on the list.

At 608, RUs detected at 606 are enabled for communication. For instance, IP addressing service is provided to the RUs such that each of the RUs is assigned an IP address. With the IP address, a given one of the RUs is then enabled to communicate, using IP protocol, with, for example, the DU emulation system 250, the testing software on the field technician's laptop, the CSR, UE (user equipment) and/or any other components. In one embodiment, a list of fixed IP addresses are predetermined for assignment to the RUs at 608.

At 610, hardware information of RUs is recorded. For example, after a given one of the RUs is assigned an IP address, the given RU is reachable through IP communication. The IP communication includes hardware information regarding the given RU, such as the MAC address of the given RU. The hardware information of the given RU is then recorded, for example, by the testing software on the field technician's laptop. The hardware information, such as the MAC address, can be used to report testing results for a particular RU as identification information of the particular RU.

At 612, precision time protocol (PTP) time and GPS location of the cell site is obtained from the CSR. In one embodiment, the testing software on the field technician's laptop is configured to obtain the PTP time and the GPS location from the CSR to ensure that the CSR is properly running with a synchronized PTP time and a correct GPS location. In various embodiments, one or more steps outlined in method 600 may be performed again if those steps do not provide intended result. For example, 606 may be performed more than once until a list of RUs known to be connected to the CSR is obtained. If one or more of such RUs are missing from the list, 606 may be performed more than once to ensure all known RUs that are supposed to be connected to the CSR are detected.

FIG. 7 illustrates an example of a method for validating connectivity of a cell site during or after installation of the cell site in accordance with one embodiment. It will be described with reference to FIG. 2. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 7 and described below is not intended to be limiting.

In some embodiments, method 700 may be implemented by a device including one or more of the processor, such as the on-site computing platform 220 shown in FIG. 2. The device may include a digital processor, an analog processor, a digital circuit designed to process information, an analog circuit designed to process information, a state machine, and/or other mechanisms for electronically processing information. The device may execute some or all of the operations of method 700 in response to instructions stored electronically on an electronic storage medium. The device may include one or more components configured through hardware, firmware, and/or software to be designed for execution of one or more of the operations of method 700. In some embodiments, method 700 is performed only after method 600 performed and returns an intended result. For instance, a pass/fail or check point may be configured in the testing software on the field technician's laptop such that only after method 600 is passed, method 700 is performed.

At 702, M-plane (management plane) connections to the RUs under test are established. In ORAN, the O-RU management functions to set parameters are done over the M-Plane. The management functions includes O-RU software management, fault management, and/or any other management functions. In one embodiment, the connections at 702 are established by the testing software on the field technician's laptop.

At 704, the RUs are queried to gather various RU information. For example, the RU information gathered at 704 includes information indicating make, model, serial number, RU-ID, current software version, memory usage, and other types of RU information for the individual ones of the RUs.

At 706, software version of the RUs is checked to ensure the RUs are installed with the current version of the RU software. It is important to perform this step before commencing other tasks because if the RU is not installed with the current RU software, tests through the RU can be erroneous or not run properly. In the event that a given RU is detected not have the current RU software, the current RU software is pushed to the given RU, for example from the testing software on the field technician's laptop or a server, and the RU is restarted to ensure the current RU software is installed and run on the given RU.

At 708, individual RUs are queried for their alarm status. The query at 708 can yield one or more alarms being reported back from the individual RUs. The alarms can then be logged, for example in a database by testing software on the field technician's laptop. Some examples of the alarms reported by the individual RUs include various issue indicators showing the RUs are not running properly. Such an issue can happen due to malfunction of the RU introduced during the manufacturing of the RU and/or during installation of the RU. An alarm indicating the RU is not properly running can be critical. Depending on the severity of the alarm, one or more tests can be adjusted. For example, a test of the RU may be delayed until the critical alarm is cleared.

At 710, SFPs (small form-factor pluggable) on the CSR and the individual RUs are queried for light levels. The SFPs return values of light levels passing through them. This can check whether fiber cables connecting the CSR and the individual RUs are clean.

At 712, ports of AISG (Antenna Interface Standards Group) connection on the RUs are discovered. These serial ports are used for the RUs to connect antennas. Through these serial ports, tests can be run to test antennas connected to the RUs.

At 714, S/N (serial numbers) of individual antenna connected to the RUs are retrieved. A S/N of a given antenna can be used as identification information of the given antenna to indicate one or more test results associated with the given antenna. In one embodiment, two RUs (for example, a low band RU and mid-band RU) are connected to an antenna, which has two connection modes. In that embodiment, the testing software on the field technician's laptop is configured to detect how the two RUs are connected (e.g., daisy chained or parallelly connected to the antenna) and determine which antenna test is to be run based on the connection configuration of the two RUs to antenna.

At 716, RET (Remote Electrical Tilt) settings of the individual antennas are obtained. An RET setting of a given antenna indicate whether the given antenna is currently tilted as intended. In one embodiment, the RET setting of the given antenna obtained at 716 should be 0 degree.

At 718, for a given antenna, a target e-tilt setting is set to test the given antenna's functionality at that target e-tilt setting. For example, the target e-tilt setting may be 10.0 e-tilt, and once the 10.0 e-tilt setting is set to the given antenna, the AISG port through which the given antenna is connected to the RU is monitored and/or queried from time to time to obtain signal receiving progress reported back from the given antenna, alarms and/or any other information from the given antenna. In one embodiment, a 10.0 e-tilt and a 0.0 e-tilt are each set to the given antenna to test the given antenna's functionality under those e-tilt setting during a preset period. For example, the given antenna is tested that it can be tilted all the way to 10.0 e-tilt and brough back to 0.0 e-tilt. In that embodiment, the e-tilt tests at 718 are executed by the testing software on the field technician's laptop.

At 720, the individual RUs are configured to transmit a set of signals. In one embodiment, the following tables indicate sequential commands with specified RF signals are sent to individual RUs for transmission at 720. In some embodiments, 720 is performed by the testing software on the field technician's laptop.

TABLE 1

| Band | DL Range | Center Freq | DL ARFCN | Test B/W* | PCI | MCC | MNC | Sub-carier spacing | RF Power |
|---|---|---|---|---|---|---|---|---|---|
| B71 | 617-652 MHz | 647.000 MHz | 129400 | 5 MHz | see table 2 | 313 | 340 | 15 KHz | 40 watts/ 46 dBm |
| B29 | 722-728 MHz | 723.000 MHz | 144600 | 1 MHz | see table 2 | 313 | 340 | 15 KHz | 40 watts/ 46 dBm |
| B70 | 1995-2020 MHz | 2007.500 MHz | 401500 | 5 MHz | see table 2 | 313 | 340 | 15 KHz | 40 watts/ 46 dBm |
| B66 | 2110-2200 MHz | 2190.000 MHz | 438000 | 5 MHz | see table 2 | 313 | 340 | 15 KHz | 40 watts/ 46 dBm |

TABLE 2

| SSS | PSS | | |
|---|---|---|---|
| | 0 | 1 | 2 |
| 326 | 978 | 979 | 980 |
| 327 | 981 | 982 | 983 |
| 328 | 984 | 985 | 986 |
| 329 | 987 | 988 | 989 |
| 330 | 990 | 991 | 992 |
| 331 | 993 | 994 | 995 |
| 332 | 996 | 997 | 998 |
| 333 | 999 | 1000 | 1001 |
| 334 | 1002 | 1003 | 1004 |
| 335 | 1005 | 1006 | 1007 |

At 722, individual RUs are queried to confirm their settings, including data sent, after 720 is performed. In the embodiment shown above, the RF parameter of data sent as reported back by the RU, should match the RF signals listed in the above tables.

At 724, individual RUs are queried for alarms. During the transmission of the RF signals alarms may be reported by the individual RUs to indicate one or more issues during the transmission. Such an alarm should be obtained at 724 and logged.

At 726, individual RUs are queried for values of VSWR (Voltage Standing Wave Ratio). This is to check if there is any undue load or balance on the individual RUs, which can be caused during the installation the individual RUs in the cabinet structure 235. For example, if a cable is wrongly plugged into a given RU, 726 can be used to detect the returned value of VSWR by the given RU does not match the expected VSWR value for the given RU, and thus catch the issue of wrong plugged-in cable.

FIG. 8 illustrates an example of a method for validating connectivity of a cell site during or after installation of the cell site in accordance with one embodiment. It will be described with reference to FIG. 2. The operations of method 800 presented below are intended to be illustrative. In some embodiments, method 800 may be accomplished with one or more additional operations not described and/or without one or more of the operations discussed. Additionally, the order in which the operations of method 800 are illustrated in FIG. 8 and described below is not intended to be limiting.

In some embodiments, method 800 may be implemented by a device including one or more of the processor, such as the on-site computing platform 220 shown in FIG. 2. The device may include a digital processor, an analog processor, a digital circuit designed to process information, an analog circuit designed to process information, a state machine, and/or other mechanisms for electronically processing information. The device may execute some or all of the operations of method 800 in response to instructions stored electronically on an electronic storage medium. The device may include one or more components configured through hardware, firmware, and/or software to be designed for execution of one or more of the operations of method 800. In some embodiments, method 800 is performed only after methods 600 and 700 performed and returns an intended result. For instance, a pass/fail or check point may be configured in the testing software on the field technician's laptop such that only after methods 600 and 700 are passed, method 800 is performed.

In some embodiments, method 800 is performed after methods 600 and 700 are performed with an indication that one or more RUs are up and running properly. Method 800 focuses on testing a link between UE and a particular one of the one or more RUs.

At 802, an instruction is provided to instruct a user (e.g., a field technician) to link UE (e.g., his/her mobile phone) with on-site computing platform (e.g., his/her laptop). In some embodiments, 802 is performed by providing such an instruction in a user interface of the testing software on the field technician's laptop.

At 804, a connection is established with the UE in the cell site. In one embodiment, 804 is performed by testing software on the field technician's laptop. In that embodiment, once a request to link the UE to the on-site computing platform is initiated by the field technician on the UE, the UE starts an app in the UE, which enables a Wi-Fi connection, such as a Bluetooth connection, with the field technician's laptop. Then, the UE starts connecting the field technician's laptop via the Wi-Fi connection. In some embodiments, 804 is performed at a request of the field technician through the user interface of the testing software on the field technician's laptop. In some embodiments, 804 is performed automatically after the UE is linked with the on-site computing platform at 802.

At 806, cell site specific data is sent to the UE via the connection established at 804 for UE to conduct various tests in the cell site. Examples of the cell site specific data sent at 806 include one or more tests for the cell site, one or more test patterns, geolocation information of the cell site, signal radiation patterns of the cell site, base station location information of the cell site, and/or any other information. The one or more test for the cell site can be designed based on a type of the cell site or a configuration of the cell site. Different test suites for the UE to run in different types or configurations of the cell sites can be developed. Once the field technician is at a particular cell site, the site specific test suite for that cell site can be sent to the UE for testing that cell site. Similarly, test patterns can also be made cell site specific such that two different cell sites may have different test patterns for the UE to run. Geolocation information of the cell site, signal radiation patterns of the cell site, and base station location information can inform the UE where to run the cell site specific test suite and/or one or more test patterns.

At 808, the user (e.g., the field technician) is instructed to go to a specific location to run one or more tests and collect sector reading using the UE. For instance, such an instruction is provided through an user interface on the UE by the testing software on the field technician's laptop. The instruction can include information as to which one(s) of the tests is to be run and where in the cell site it should be run, information indicating that how the user should collect sector reading using the UE after the test(s) is completed, and/or any other information.

At 810, geographical information regarding where to stand for sector test is provided after the user is instructed to perform the sector test at 808. For example, a map overlaid with base station locations can be presented to the user on the UE to show where the sector test should be performed by the technician.

At 812, the user is instructed to remain still (or relatively still) while taking the readings of the sector test once he/she is in the target area for the sector test. In some embodiments, 812 involves receiving location information of the UE and determine that the user is indeed in the target area. In some embodiments, 812 involves the user confirms that he/she is in the target area through the user interface on the UE. In one embodiment, UE progress of reading (e.g., a counter or a slide bar) is provided on the user interface on the UE to inform the user of a progress of the sector test. In one embodiment, all TEST PCIs received are and respective RSRP, RSRQ, SINR are logged by the UE.

At 814, an instruction is provided to the user to go to the next sector in the cell site for another sector test. As can be seen, similar to the sector test steps mentioned above, after 814, the process in method 800 can loop back to 810. This can repeat for however many sector tests are to be performed in the cell site.

At 816, after the final sector test is performed, an instruction is provided on the UE to instruct the user to go back to a proximity of the on-site computing platform. This may involve determining all sector tests for the cell site have been performed by the UE and readings for the sector tests are recorded on the UE.

At 818, once the UE is within the proximity of the on-site computing platform (e.g., the field technician's laptop), the UE is connected to the on-site computing platform. This may involve detecting that the UE is indeed within the proximity of the field technician's laptop. In some embodiments, the user confirms on the laptop that he/she has returned to the laptop and the UE is ready to be connected to the laptop. In one embodiment, the UE is connected to the laptop via Bluetooth.

At 820, test data from the sector test(s) is uploaded from the UE to the on-site computing platform. In some embodiments, a confirmation is provided in the user interface on the on-site computing platform such as the technician's laptop that the test data has been successfully uploaded to the laptop.

At 822, calculations are made based on the test data received at 820 by the on-site computing platform. In one embodiment, 822 involves evaluating downlink signal strength and/or quality collected by the UE at various sectors of the cell site to determine if the RUs are transmitting signals as intended. If the downlink signal strength and/or quality for a particular sector do not meet expected threshold values, this can be used as an indication that faulty installation and/or wiring of the RUs may have occurred during construction of the cell site. For example, this can be caused by mis-wiring between RU and corresponding antenna.

At 824, based on the calculations made at 822, one or more pass or fail results are indicated. In some embodiments, the results at 824 are indicated in the user interface in the testing software on the field technician's laptop. In one embodiment, for a FAIL result, the laptop indicates areas that failed and has suggested fixes; instructs the user to re-run tests once repairs have been made. In that embodiment, for the fail result, the user interface of testing software on the field technician's laptop has a "Retest" button which restarts the testing software for the field to re-run methods 600, 700, and/or 800. For PASS results, the laptop logs all data shown as passing, and instructs user to connect to internet to send Pass Report.

At 826, the CSR is reconfigured back to Day-0 "listening" mode. In some embodiments, 826 is performed by testing software on the field technician's laptop. The Day-0 listening mode is a mode in which the CSR listens for instruction message for configuration. In various embodiments, even if the test is failed, the CSR is still desired to be reconfigured back to this mode while issues are being addressed and fixed.

FIG. 9 illustrates an example of a method for validating connectivity of a cell site during or after installation of the cell site in accordance one embodiment. It will be described with reference to FIG. 2. The operations of method 900 presented below are intended to be illustrative. In some embodiments, method 900 may be accomplished with one or more additional operations not described and/or without one or more of the operations discussed. Additionally, the order in which the operations of method 900 are illustrated in FIG. 9 and described below is not intended to be limiting.

In some embodiments, method 900 may be implemented by a device including one or more of the processor, such as the on-site computing platform 220 shown in FIG. 2. The device may include a digital processor, an analog processor, a digital circuit designed to process information, an analog circuit designed to process information, a state machine, and/or other mechanisms for electronically processing information. The device may execute some or all of the operations of method 900 in response to instructions stored electronically on an electronic storage medium. The device may include one or more components configured through hardware, firmware, and/or software to be designed for execution of one or more of the operations of method 900. In some embodiments, method 900 is performed only after method 600, 700 and 800 performed and returns an intended result. For instance, a pass/fail or check point may be configured in the testing software on the field technician's laptop such that only after method 600, 700 and 800 are passed, method 900 is performed.

At 902, internet connection is detected, and server (e.g., server 506 shown FIG. 5) is pinged. In some embodiments, 902 is performed by testing software on the field technician's laptop. At 904, connection with the server is detected. In some embodiments, a message indicating test results or reports are ready to be sent is displayed at 904. At 906, test results or reports are sent to the server. This may involve authentication with the server, and logging any communication errors during the sending of the test results or reports. At 908, a check whether cell site data is updated with the test results or reports sent at 904 by the server. At 910, an indication is provided to the user on the laptop to show the cell site is updated and testing software can be closed.

Example Computing System

Figure 10:
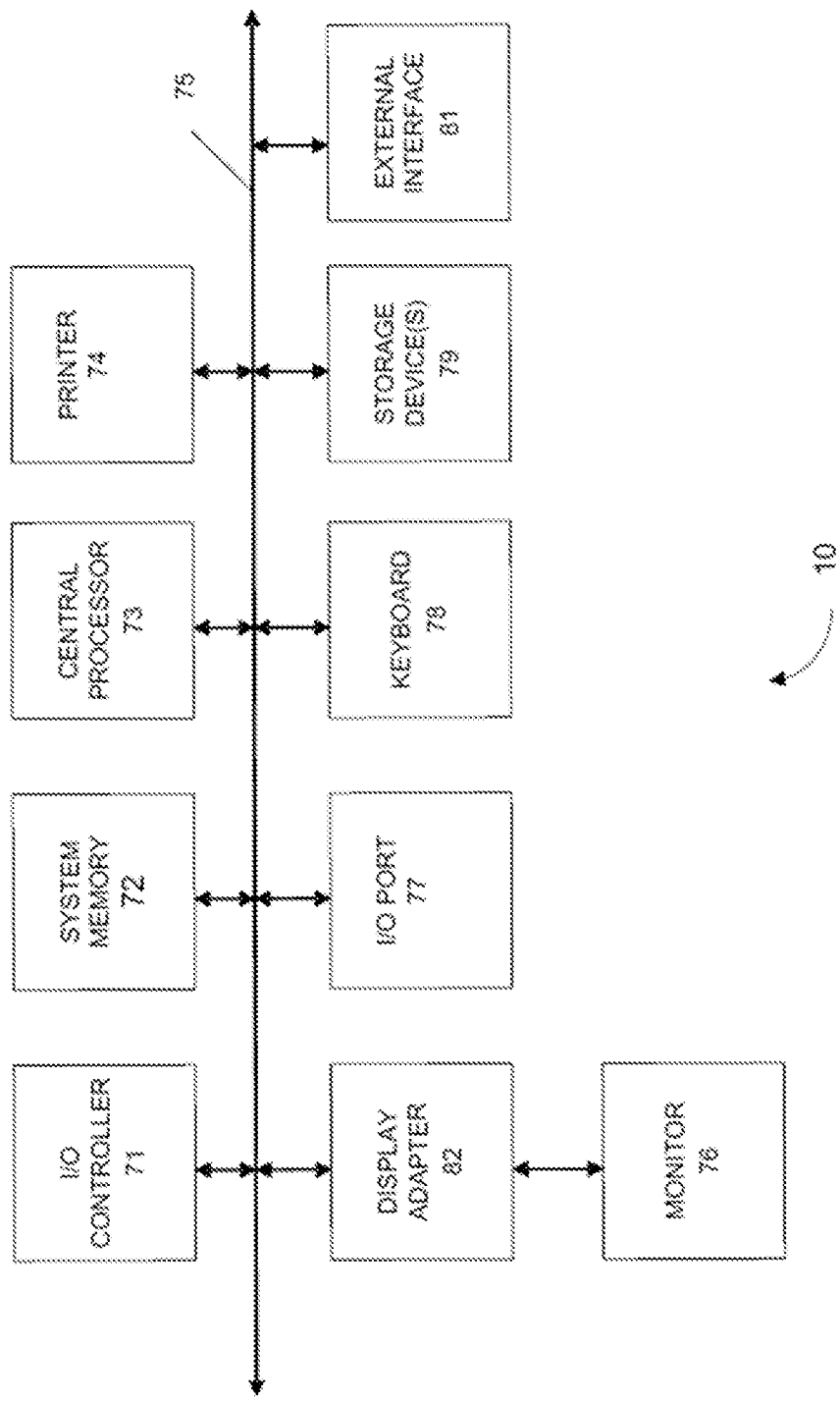
FIG. 10 generally illustrates an example computing platform that can be used to implement various methods described and illustrated herein.

Any of the embodiments mentioned herein may be implemented by or utilize any suitable number of subsystems. Examples of such subsystems are shown in FIG. 10 in computing system 10, which can be configured to implement various features and/or functions described herein. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 5 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A computing platform configured to perform one or more tests during or after construction of a cell site, the computing platform comprises at least one processor configured to execute machine-readable instructions such that when the machine-readable instructions are executed, the at least one processor is caused to perform:
    establishing a connection with a cell site router (CSR) of the cell site;
    configuring the CSR for the one or more tests;
    establishing a connection with a radio unit (RU) through the CSR, wherein the RU is connected with the CSR;
    determining whether an installed version of RU software for the RU is a current version of the RU software;
    in response to the determination that the installed version of the RU software is the current version of the RU software, querying the RU for an alarm status;
    establishing, through the RU, a connection with an antenna connected to the RU;
    instructing the antenna to tilt to a first e-tilt degree;
    obtaining data from the antenna, wherein the data indicates one or more of a functionality of the antenna at the first e-tilt degree, or an alarm from the antenna;
    based at least in part on the data from the antenna, providing an instruction to a user equipment (UE) to perform a sector test between user equipment and the RU;
    receiving, from the UE, a test result regarding the sector test;
    generating a test report based on the test result; and
    uploading the test report to a server via a network.

2. The computing platform of claim 1, wherein the test result indicates a failure of at least one area in the cell site.

3. The computing platform of claim 2, wherein the processor is further caused to perform: generating a suggestion to fix the failure based on the test result.

4. The computing platform of claim 1, wherein generating the test report based on the test result comprises: evaluating the test result to determine a downlink signal strength or quality between the UE and the RU.

5. The computing platform of claim 1, wherein the processor is further caused to perform: after the test result is received, configuring the CSR to listening mode for messages from the server.

6. The computing platform of claim 1, wherein the processor is further caused to perform instructing the antenna to tilt to a second e-tilt degree from the first e-tilt degree.

7. The computing platform of claim 1, wherein the processor is further caused to perform: in response to the determination that the installed version of the RU does not have the current version of the RU software, causing the RU to be configured with the current version of the RU software.

8. A non-transitory computer readable medium comprising machine-readable instructions such that when the machine-readable instructions are executed, at least one processor is caused to perform:
    establishing a connection with a cell site router (CSR) of a cell site;
    configuring the CSR for one or more tests;
    establishing a connection with a radio unit (RU) through the CSR, wherein the RU is connected with the CSR;
    determining whether an installed version of RU software for the RU is a current version of the RU software;
    in response to the determination that the installed version of the RU software is the current version of the RU software, querying the RU for an alarm status;
    establishing, through the RU, a connection with an antenna connected to the RU;
    instructing the antenna to tilt to a first e-tilt degree;
    obtaining data from the antenna, wherein the data indicates one or more of a functionality of the antenna at the first e-tilt degree, or an alarm from the antenna;
    based at least in part on the data from the antenna, providing an instruction to a user equipment (UE) to perform a sector test between user equipment and the RU;
    receiving, from the UE, a test result regarding the sector test;
    generating a test report based on the test result; and
    uploading the test report to a server via a network.

9. The non-transitory computer readable medium of claim 8, wherein the test result indicates a failure of at least one area in the cell site.

10. The non-transitory computer readable medium of claim 9, wherein the processor is further caused to perform: generating a suggestion to fix the failure based on the test result.

11. The non-transitory computer readable medium of claim 8, wherein generating the test report based on the test result comprises: evaluating the test result to determine a downlink signal strength or quality between the UE and the RU.

12. The non-transitory computer readable medium of claim 8, wherein the processor is further caused to perform: after the test result is received, configuring the CSR to listening mode for messages from the server.

13. The non-transitory computer readable medium of claim 8, wherein the processor is further caused to perform: instructing the antenna to tilt to a second e-tilt degree from the first e-tilt degree.

14. The non-transitory computer readable medium of claim 8, wherein the processor is further caused to perform:

in response to the determination that the installed version of the RU does not have the current version of the RU software, causing the RU to be configured with the current version of the RU software.

15. A method for performing one or more tests during or after construction of a cell site, the method being implemented by at least one processor configured to execute machine-readable instructions such that when the machine-readable instructions are executed, the at least one processor implements the method, wherein the method comprises:
   establishing a connection with a cell site router (CSR) of the cell site;
   configuring the CSR for the one or more tests;
   establishing a connection with a radio unit (RU) through the CSR, wherein the RU is connected with the CSR;
   determining whether an installed version of RU software for the RU is a current version of the RU software;
   in response to the determination that the installed version of the RU software is the current of the RU software, querying the RU for an alarm status;
   establishing, through the RU, a connection with an antenna connected to the RU;
   instructing the antenna to tilt to a first e-tilt degree;
   obtaining data from the antenna, wherein the data indicates one or more of a functionality of the antenna at the first e-tilt degree, or an alarm from the antenna;
   based at least in part on the data from the antenna, providing an instruction to a user equipment (UE) to perform a sector test between user equipment and the RU;
   receiving, from the UE, a test result regarding the sector test;
   generating a test report based on the test result; and
   uploading the test report to a server via a network.

16. The method of claim 15, wherein the test result indicates a failure of at least one area in the cell site.

17. The method of claim 16, wherein the method comprises: generating a suggestion to fix the failure based on the test result.

18. The method of claim 15, wherein generating the test report based on the test result comprises: evaluating the test result to determine a downlink signal strength or quality between the UE and the RU.

19. The method of claim 15, wherein the processor is further caused to perform: after the test result is received, configuring the CSR to listening mode for messages from the server.

20. The method of claim 15, wherein the processor is further caused to perform instructing the antenna to tilt to a second e-tilt degree from the first e-tilt degree.

* * * * *